T. H. MACK.
EQUIPMENT OF CONE CENTERS.
APPLICATION FILED APR. 27, 1912.
1,076,986.
Patented Oct. 28, 1913.
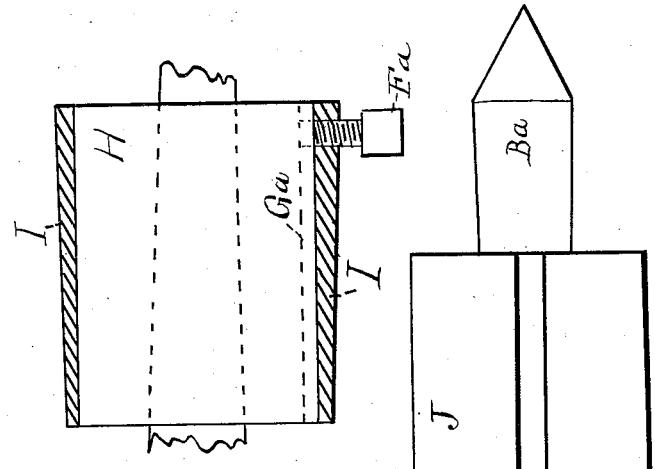
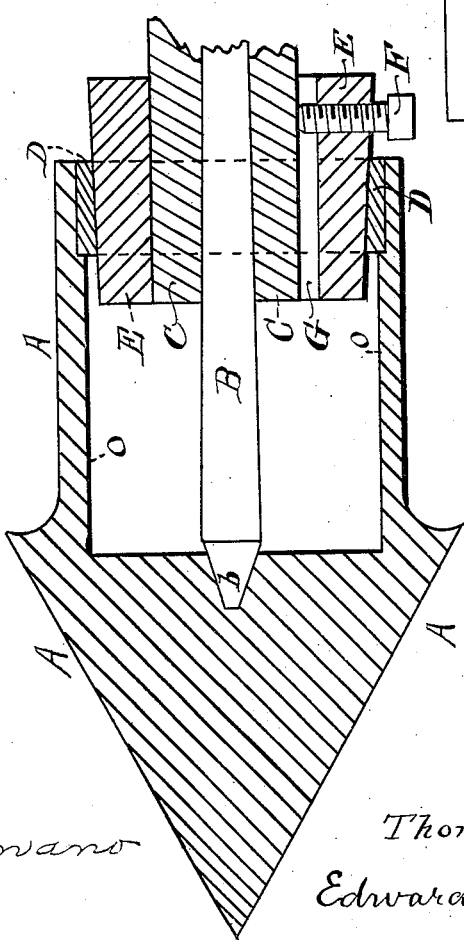
WITNESSES:
John Gusmano
E. Hurning
INVENTOR
Thomas H Mack,
BY
Edward P. Thompson
ATTORNEY

UNITED STATES PATENT OFFICE.

THOMAS H. MACK, OF NEW YORK, N. Y.

EQUIPMENT OF CONE-CENTERS.

1,076,986.

Specification of Letters Patent. Patented Oct. 28, 1913.

Application filed April 27, 1912. Serial No. 693,705.

*To all whom it may concern:*

Be it known that I, THOMAS H. MACK, a citizen of the United States, and resident of New York city, in the county and State of New York, have invented certain new and useful Improvements in Equipment of Cone-Centers, of which the following is a specification.

The object of my invention is to provide simple means for enabling the same cone center of a lathe to be used with center pins and spindles of different diameters.

The devices are exhibited in the accompanying drawings, in which,—

Figure 1 is an axial section of the structure involving my invention. Fig. 2 is a view partly in section of a tail stock spindle and its adjuncts. Fig. 3 is a plan of the head stock spindle and center pin.

I will now describe only what is shown in the drawing.

At A is the cone center.

B represents a center pin located in a spindle C and having its end $b$ terminating in a conical recess in the inside of said center. This recess is indicated as being occupied by the end $b$. Surrounding this spindle C is a bushing ring E fastened to the spindle C by a set screw F, which passes through the ring E and terminates in a slot G in the spindle C.

In practice, it becomes necessary, as well known to those versed in the art to which my invention belongs, to use the cone center A with a larger spindle H on occasions. I therefore adapt this spindle H to the cone center A by means of a ring bushing I, which is of approximately the same outside diameter as the internal diameter of the ring bushing D. It is now evident that the spindle H with its ring bushing I may be used with the cone center A as well as the spindle C. Other spindles of different diameters may be similarly equipped so as to fit properly for rotation in the cone center A.

My invention is not limited to having tapering surfaces on the bushing rings E and I, and on the ring D, as indicated in the drawing. But this style is preferable, for then the wear is provided for so that as the wear takes place, the bushing E or I may be inserted farther into the ring D. Fig. 1 illustrates this feature. When new, the bushing E is supposed to have entered only far enough to make use of the whole bearing surface of the ring D. Now when wear occurs, sufficiently, the ring bushing E will be located as far or farther than as indicated in Fig. 1.

The invention is capable of modification. For example, the head stock spindle J, having the slot $G^b$ and center pin $B^a$ may be equipped with ring bushings of different diameters successively for a similar purpose as the tail stock spindle C or H. In all cases, the ring bushings may be held to the spindles by means of set screws. Thus the set screw F passes through the bushing E, enters the slot G in the spindle C and presses upon the spindle C. The set screw $F^a$ is screwed through the bushing I, enters the slot $G^a$ in the spindle H, and thus holds the spindle and bushing together at any point along the length of the spindle. The slot $G^b$ is for a similar purpose.

I claim as my invention:—

1. In an article of the class described, the combination of a cone center having an internal bearing surface, a spindle, and a ring bushing detachably mounted upon said spindle for fitting within said bearing.

2. In an article of the class described, the combination of a cone center, a ring with a tapering internal bearing surface fitted in a fixed manner in the open end of said cone center, a ring bushing rotary in said bearing surface and itself being also tapering, and a spindle passing through and fixed to said ring bushing.

THOMAS H. MACK.

Witnesses:
 EDWARD P. THOMPSON,
 KATHERINE M. VIETS.

Copies of this patent may be obtained for five cents each, by addressing the "Commissioner of Patents, Washington, D. C."